United States Patent [19]

Pearson

[11] Patent Number: 4,468,495

[45] Date of Patent: Aug. 28, 1984

[54] FIRE RETARDANT POWDERS

[76] Inventor: Glenn A. Pearson, P.O. Box 6051, Alexandria, Va. 22305

[21] Appl. No.: 462,078

[22] Filed: Jan. 28, 1983

[51] Int. Cl.³ .................... C08L 85/02; C08L 61/24; C08G 79/04
[52] U.S. Cl. .................... 525/158; 106/18.14; 106/18.18; 252/607; 428/505; 428/526; 428/530; 428/920; 524/512; 524/598; 525/164; 525/443; 525/456; 528/244; 260/DIG. 24
[58] Field of Search ............... 524/416, 417, 706, 512; 525/163, 934, 158, 164; 528/242, 262, 244; 260/DIG. 24; 106/18.14, 18.18

[56] References Cited

U.S. PATENT DOCUMENTS

| | | | |
|---|---|---|---|
| 2,452,054 | 10/1948 | Jones et al. | 260/17.3 |
| 2,632,742 | 3/1953 | Eckert | 260/17.3 |
| 2,681,326 | 6/1954 | Christianson | 260/39 |
| 3,883,462 | 5/1975 | Pearson | 260/29.4 R |
| 3,983,269 | 9/1976 | Pearson | 427/370 |
| 3,984,367 | 10/1976 | Pearson | 260/29.4 R |
| 3,990,977 | 11/1976 | Pearson | 252/8.1 |
| 4,119,598 | 10/1978 | Pearson | 260/29.4 R |
| 4,215,172 | 7/1980 | Pearson | 428/264 |
| 4,370,442 | 1/1983 | Pearson | 524/598 |

FOREIGN PATENT DOCUMENTS 827645 2/1960 United Kingdom .

Primary Examiner—Theodore E. Pertilla
Attorney, Agent, or Firm—Lowe, King, Price & Becker

[57] ABSTRACT

Fire retardant compositions in the form of a powder are produced from the following components:

| Component | Parts by Weight |
|---|---|
| Aldehyde | 70–110 |
| Ammonium phosphate | 120–180 |
| Ammonium sulfate | 120–180 |
| Urea | 120–180 |
| Alkanolamine | 35–50 |
| Phosphoric acid | 100–150 |

Also provided are fire retardant compositions containing the powder, and methods for treating substrates such as paper or wood to impart fire retardant properties thereto.

10 Claims, No Drawings

FIRE RETARDANT POWDERS

FIELD OF THE INVENTION

The present invention relates to resinous powder fire retardant compositions, and more particularly relates to powders whereby an aldehyde, an ammonium phosphate, ammonium sulfate, urea, an alkanol amine and phosphoric acid are sequentially reacted in selected proportions to yield a resinous powder composition providing unique fire retardant properties and/or characteristics when applied to various cellulosic and synthetic substrates.

BACKGROUND ART

There is substantial literature describing the use of urea-formaldehyde liquid resins for application to textiles and similar cellulosic and synthetic resin substrates. A number of resins of this type are described in my prior U.S. Pat. Nos. 3,883,462; 3,983,269; 3,984,367; 3,990,977; 4,119,598; 4,215,172. My copending application Ser. No. 404,915, filed Aug. 3, 1982, now U.S. Pat. No. 4,419,401, and Ser. No. 404,916, now U.S. Pat. No. 4,427,745, filed Aug. 3, 1982, also disclose resinous systems which have excellent fire retardant characteristics.

A number of attempts have been made to condense such systems into powders for use in various materials which present fire hazard problems, and which must be compatible with melamine and urea-formaldehyde adhesives as well as adhesives of various types for use in making plywood and particle board.

The powdered compositions of the present invention are improvements over the aqueous compositions of my prior patents and applications in providing a very stable product which is more efficient than a liquid, reduces shipping costs, and is more fire retardant per pound.

SUMMARY OF THE INVENTION

It is accordingly a primary object of the invention to provide a fire-retardant urea-formaldehyde powder resin which does not have objectionable formaldehyde odors.

A further object of this invention is to provide a method for producing the fire retardant powder.

It is a further object of this invention to provide a substantially water-insoluble, fire-retardant resin powder which is useful as a filler in various plastics, adhesives, textiles, and paper products, and for coating a variety of substrates to impart fire-retardant properties thereto.

These and other objects of the present invention will be more readily apparent from the following detailed description.

In satisfaction of the foregoing objects and advantages, there is provided by this invention a composition in the form of a powder which is produced from the following components:

| Component | Parts by Weight |
| --- | --- |
| Aldehyde | 70–110 |
| Ammonium phosphate | 120–180 |
| Ammonium sulfate | 120–180 |
| Urea | 120–180 |
| Alkanolamine | 35–50 |
| Phosphoric acid | 100–150 |

Also provided by the invention are fire retardant compositions containing the powder, and methods for treating substrates to impart first retardant properties thereto.

DESCRIPTION OF THE PREFERRED EMBODIMENT

As pointed out above, the present invention is concerned with a urea-formaldehyde resinous powder which has unique characteristics and which is an improvement over the liquid resins described in my prior patents and other prior art. The resinous powder of this invention is particularly suitable as a fire retardant filler and coating for use with cellulosic and synthetic products generally, and particularly for use as a coating or filler with paper, cardboard, wood, or any other material which is subject to burning.

In its broadest aspects, the composition comprises the following components:

| Component | Parts by Weight |
| --- | --- |
| Aldehyde | 70–110 |
| Ammonium phosphate | 120–180 |
| Ammonium sulfate | 120–180 |
| Urea | 120–180 |
| Alkanolamine | 35–50 |
| Phosphoric acid | 100–150 |

The product is a fine white solid powder which preferably will not pass through a +200 mesh screen. It is insoluble in hot and cold water and is not soluble in ordinary solvents.

The ratios given above should not deviate from the stated amount by more than 15% because the unique properties of the polymer may be affected, and to this extent the ratios are critical. Further, the materials should be mixed in the sequence described herein.

The fire retardant powder of the present invention provides a number of advantages over fire retardants of the prior art, including those of my prior patents and applications discussed above. Thus, since it is a powder rather than an aqueous solution, shipping costs are lower because the solvent does not have to be shipped. Further, more fire retardant per pound is obtained. Further, airing is not required although the composition may have to be dried, either by air drying or by application of heat. Further, the powder resin does not stiffen or weaken fibers. The powder may be applied to paper, wood, plastic or other substrates, or mixed with other compositions such as paints. It may be colored with a pigment or dye and may be mixed with $TiO_2$ or carbon black. It may also be mixed with other fillers. An especially important advantage is that the powder does not leave residual formaldehyde odors on the treated substrates.

In one embodiment, the powder is used by mixing with water to form a suspension. Any desired concentration may be used, e.g., from 5 to 50 parts of powder per 100 parts of water. To impregnate fabrics, about 10–15 parts of powder in 100 parts of water is preferred. In other embodiments, the powder may be used to coat wood and plastic substrates where a binder is included in the composition. Suitable binders include lacquers and acrylic resins. When using a binder of this type, the binder is the carrier so that water is not necessary. The powder is usually mixed with about 5 to 50 parts of binder. The powder can also be incorporated into fibers and plastic systems such as polyurethane to provide fire retardant properties in situ.

The ammonium phosphate, ammonium sulfate and urea are used in the solid form which are available commercially. Equivalent materials may of course be used provided the same results are achieved. The phosphoric acid is preferably added as an 85% aqueous solution, as this form is commercially available.

While urea is the preferred reactant, it should be understood that other ureas such as thiourea, ethylene urea, dimethylol ethylene urea, or other substituted urea may be employed. The urea is preferably added as the commercial form which contains about 46% nitrogen.

As the aldehyde, one may use a simple aldehyde such as formaldehyde, acetaldehyde, paraldehyde, glyoxal, or other mono-, di, or poly-aldehydes. In addition, any substance yielding or acting as an aldehyde may be used. Formaldehyde is the preferred aldehyde as it is conveniently obtained commercially as a 37 weight percent aqueous solution.

The ammonium phosphate may be diammonium phosphate (DAP), monoammonium phosphate (MAP), or mixtures thereof. DAP is preferred.

The preferred alkanolamine will have 1 to 4 carbon atoms in the alkyl group, and the most preferred alkanolamine is triethanolamine, but others such as diethanolamine or mixtures may also be used. Triethanolamine is commercially available as an 85 weight percent solution.

In producing the powder of the present invention, the aldehyde, ammonium phosphate, ammonium sulfate, urea, and alkanolamine are stirred together and heated, until the liquid becomes semi-clear. Usually a temperature of about 160°-200° F. will be required. At this point, the pH is about 6.5. The phosphoric acid is added, causing further heat to be generated. The liquid is then stirred until it turns whitish, at which point it is poured into a milling apparatus such as a rotary drier, and milled until it becomes a solid mass. A solid will be formed in about 15-20 minutes, depending on volume. When the composition cools, slight pressure is applied, and the mass forms a fine white powder, which is highly insoluble to water, and is suitable for further grinding. The yields are excellent based on original ingredients. Fines may be removed by air classification. Further grinding may be used to further reduce the particle size. The powder contains some moisture and will also regain the moisture loss. Thus, when a 100 g sample was air-dried for 72 hours and then placed in a 350° F. oven for an hour, and reweighed, there was a weight loss of 5%. However, the sample regained 4% of this weight loss after exposure to the air for 48 hours. The weight loss may therefore be attributed to moisture. The powder did not congeal or turn brown as many urea-formaldehyde products do.

It has been found that formulations produced according to the present invention are particularly useful for application to textiles and textile-related products since they do not adversely affect the hand of the fabric treated and do not leave residual odors, such as formaldehyde odors on the fabric. When applied to the surface of the fabric, the fabric will pass the smolder test for fire retardancy, and when immersed in the solution of the invention, the treated fabric will pass the vertical flame test.

In a further important aspect of the present invention, the addition of an acrylic base to the powder allows the use of the composition as a coating for fiber boards, plywood, and other cellulosic and synthetic substrates.

In another aspect of the invention, the composition can be used as a coating or filler for paper products, thereby imparting self extinguishing characteristics to the treated products.

And in a further aspect of the invention, the composition can be used as a filler for various plastics that present a fire hazard problem, such as polyester laminates, polyethylene for wire coating, and other uses.

The following examples are presented to illustrate the invention, but it is not to be considered as limited thereto. In the examples and throughout the specification, parts are by weight, unless otherwise specified.

EXAMPLE 1

The following composition was prepared:

| Components | Parts by Weight (Gms) |
|---|---|
| 37% Formaldehyde | 243 |
| Diammonium phosphate (granular) | 150 |
| Ammonium sulfate (granular) | 150 |
| Ammonium sulfate (granular) 150 | |
| Urea | 150 |
| 85% Triethanolamine | 50 |

Each of the above ingredients was stirred in and the solution was heated to 82 C., until the liquid became semi-clear. Then, 150 grams of 85% phosphoric acid was added, causing further heat to be generated. The liquid was then stirred until it turned whitish, and poured into a rotary drier and milled until it became a solid mass. The composition was cooled, and a light pressure was applied until the mass formed a fine, white powder. A 92% yield was obtained based on the original ingredients.

EXAMPLE 2

The following formulation was prepared:

| Components | Parts by Weight (Gms) |
|---|---|
| Water | 100 |
| Powder resin of Example 1 | 15 |
| Vinyl acetate | 5 |

A swatch of 100% cottom mattress ticking was immersed in a solution of this formulation and squeezed down to 100%, wet, dried, and pressed. The swatch was then hand washed, rinsed, dried, and repressed. A vertical flame test was conducted by hanging the sample vertically over a bunsen burner flame for 10 seconds, and removing the flame. The sample charred, but the flame extinguished itself in a few seconds. The sample passed the test.

EXAMPLE 3

The same treated ticking was then subjected to the cigarette smolder test. A mock up of a mattress was made by placing a 4×8×2" piece of urethane foam over a 4×8×½" sheet of particle board, and a 10×10" swatch of the ticking was pulled tightly over both, and tacked to the back of the board. Three cigarettes were lighted and placed two inches apart and left to burn until consumed. At the end of the test, there was no sign of ignition of the ticking or foam, and the chars on the ticking were the dimensions of the burned cigarettes.

EXAMPLE 4

The same treated ticking was observed for changes in perceptible characteristics and tested for tear strength. The hand or feel of the ticking was excellent, and there was no visible change in color and no odor. When the untreated ticking was tested, the warp tested at 10 lbs. and the fill at 8 lbs. The treated sample tested at 9 lbs. in warp and 7.5 lbs. in fill.

EXAMPLE 5

The following formulation was prepared:

| Composition | Parts by Weight (Gms) |
| --- | --- |
| Water | 400 |
| Papertowel | 8 |
| Powder resin of Example 1 | 1.25 |

The water was placed in a kitchen blender. The paper towel was shredded and dropped into the water while the blender was running, thereby forming a slurry of paper fiber. The fire retardant powder resin was added and blended thoroughly for 2 to 3 minutes. The slurry was poured over a screen which had been placed over a pan to catch the excess water. The drained mat of fibers was then pressed to remove more water, and the damp mat was rolled onto a flat surface, and completely dried with a hot air blower. The resulting sheet was about 1/32 of an inch in caliper, and measured 10×9 inches in length and width. A number of strips were then cut and subjected to the vertical burn test. All were self-extinguishing.

EXAMPLE 6

Two samples of fiberboard used in TV backs were prepared. Both had been coated with a fire retardant sufficiently to pass the burn test as required by Underwriters Laboratories. One sample was further coated with a composition comprising the fire resistant powder of Example 1 and an acrylic based binder manufactured by Rohm & Haas. The other board sample was treated with the composition of Example 1 of my copending application Ser. No. 404,916, filed Aug. 3, 1982. Both samples passed the burn test.

The Board treated with the composition of Ser. No. 404,916 was then subjected to the dielectric test as follows: Two lead wires were connected to the untreated fiberboard 1 inch apart, and a voltage of 1600 v was applied, resulting in a current of 25 micro amps. An arc was observed.

The same test was conducted on the board with the powder resin of Example 1, and no arcing was observed thus demonstrating that the composition of the invention will pass the dielectric test when this is a problem as in the TV backboard industry.

The invention has been described herein with reference to certain preferred embodiments. However, as obvious variations thereon will become apparent to those skilled in the art, the invention is not considered to be limited thereto.

What is claimed is:

1. A fire retardant composition comprising a powder resin which is the reaction product of the following components: (a) about 70–110 parts by weight of an aldehyde, (b) about 120–180 parts by weight of an ammonium phosphate, (c) about 120–180 parts by weight of ammonium sulfate, (d) about 120–180 parts by weight of urea, (e) about 35–50 parts by weight of alkanolamine, and (f) about 100–150 parts by weight of phosphoric acid, components (a), (b), (c), (d) and (e) having been mixed together and heated at temperatures of about 160°–200° F., the phosphoric acid then being added to a mixture of all the other components.

2. A composition according to claim 1 wherein the composition also contains a water miscible binder selected from the group consisting of lacquer and an acrylic resin.

3. A composition according to claim 1 wherein the aldehyde is present in an amount of about 80–100 parts by weight, the ammonium phosphate is present in an amount of about 130–170 parts by weight, the ammonium sulfate is present in an amount of about 130–170 parts by weight, the urea is present in an amount of about 130–170 parts by weight, the alkanolamine is present in an amount of about 40–45 parts by weight, and the phosphoric acid is present in an amount of about 110–140 parts by weight.

4. A composition according to claim 3 which contains about 5–50 parts by weight of a water miscible binder selected from the group consisting of lacquer and an acrylic resin.

5. A composition according to claim 1 wherein the aldehyde is 37% formaldehyde.

6. A composition according to claim 1 wherein the alkanolamine is 85% triethanolamine.

7. A composition according to claim 1 wherein the phosphoric acid is 85% phosphoric acid.

8. A composition according to claim 1 wherein the ammonium phosphate is diammonium phosphate.

9. A fire retardant powder composition comprising about 243 parts of 37% formaldehyde, about 150 parts of diammonium phosphate, about 150 parts of ammonium sulfate, about 150 parts of urea, about 50 parts of 85% triethanolamine, and about 150 parts of 85% phosphoric acid, the phosphoric acid being added to a mixture of the other ingredients.

10. A composition according to claim 9 which also contains a water miscible binder selected from the group consisting of lacquer and an acrylic resin.

* * * * *